United States Patent
Guo et al.

(10) Patent No.: US 12,088,196 B2
(45) Date of Patent: Sep. 10, 2024

(54) POWER EXPANDING APPARATUS FOR THREE-PHASE LLC CIRCUIT

(71) Applicant: SHENZHEN UUGREENPOWER CO., LTD., Guangdong (CN)

(72) Inventors: Xiaoliang Guo, Guangdong (CN); Jianguo Bai, Guangdong (CN); Zhenghai Wan, Guangdong (CN); Likuan Deng, Guangdong (CN)

(73) Assignee: SHENZHEN UUGREENPOWER CO., LTD., Shenzhen (CN)

( * ) Notice: Subject to any disclaimer, the term of this patent is extended or adjusted under 35 U.S.C. 154(b) by 0 days.

(21) Appl. No.: 18/636,430

(22) Filed: Apr. 16, 2024

(65) Prior Publication Data

US 2024/0258912 A1 Aug. 1, 2024

Related U.S. Application Data

(63) Continuation of application No. PCT/CN2023/136218, filed on Dec. 4, 2023.

(30) Foreign Application Priority Data

Dec. 6, 2022 (CN) .......................... 202211557940.1

(51) Int. Cl.
*H02M 3/00* (2006.01)
*H02M 1/00* (2006.01)
*H02M 3/335* (2006.01)

(52) U.S. Cl.
CPC ............. *H02M 3/01* (2021.05); *H02M 1/007* (2021.05); *H02M 3/33573* (2021.05)

(58) Field of Classification Search
CPC ..... H02M 3/01; H02M 1/007; H02M 3/33573
See application file for complete search history.

(56) References Cited

U.S. PATENT DOCUMENTS 10,804,812 B1 * 10/2020 Dehem .............. H02M 3/33571
11,463,011 B1 * 10/2022 Wallace ............ H02M 3/33571
(Continued)

FOREIGN PATENT DOCUMENTS

| CN | 112332671 A | 2/2021 |
| CN | 114039491 A | 2/2022 |
| CN | 115720047 A | 2/2023 |

OTHER PUBLICATIONS

International Search Report of PCT Patent Application No. PCT/CN2023/136218 issued on Feb. 9, 2024.
(Continued)

*Primary Examiner* — Kyle J Moody

(57) ABSTRACT

A power expanding apparatus for three-phase LLC circuit is disclosed, which includes full-bridge switching networks, resonant networks, transformer networks, and rectifying networks. A primary side of a first transformer network is connected with an input voltage sequentially through a first resonant network and a first full-bridge switching network, a secondary side of the first transformer network is connected with a load through a first rectifying network; a primary side of a second transformer network is connected with the input voltage sequentially through a second resonant network and a second full-bridge switching network, and a secondary side of the second transformer network is connected with the load through a second rectifying network. Secondary sides of two transformer units in the first transformer network are in star-type connection with a secondary side of one transformer unit in the second transformer network. This apparatus expands output power and solves voltage-sharing and current-sharing problems.

5 Claims, 6 Drawing Sheets

(56) References Cited

U.S. PATENT DOCUMENTS

| | | | |
|---|---|---|---|
| 11,520,392 B1* | 12/2022 | Breen | G06F 1/20 |
| 11,682,978 B2* | 6/2023 | Liu | H02M 1/4241 |
| | | | 363/17 |
| 2012/0098331 A1* | 4/2012 | Krause | H02M 3/33573 |
| | | | 307/9.1 |

OTHER PUBLICATIONS

Written Opinion of the International Searching Authority of PCT Patent Application No. PCT/CN2023/136218 issued on Feb. 9, 2024.

* cited by examiner

POWER EXPANDING APPARATUS FOR THREE-PHASE LLC CIRCUIT

CROSS-REFERENCE TO RELATED APPLICATIONS

The present application is a Continuation Application of PCT Application No. PCT/CN2023/136218 filed on Dec. 4, 2023, which claims the benefit of Chinese Patent Application No. 202211557940.1 filed on Dec. 6, 2022. All the above are hereby incorporated by reference in their entirety.

TECHNICAL FIELD

The disclosure relates to the technical field of new energy resources, and more particularly to a power expanding apparatus for three-phase LLC circuit.

BACKGROUND

New energy vehicles, especially electric vehicles, have recently experienced unprecedented development. In order to satisfy charging requirements of electric vehicles, requirements for power and reliability of charging modules in charging piles are increasing day by day. Existing charging modules typically use LLC topology circuits. However, in high-power applications, multiple LLC circuits need to be interleaved and connected in parallel to increase output power and reduce output ripple. However, as LLC circuits are affected by resonance parameter deviations, there are certain issues between different LLC circuits, for example, voltage-sharing or current-sharing cannot be implemented between different LLC circuits.

Therefore, a power expanding apparatus for three-phase LLC circuit, is needed, which requires minimal modifications to a LLC topology circuit, facilitates low-cost manufacturing and implementation, while also is capable of improving output power, achieving wide-range output, and solving voltage-sharing and/or current-sharing problems.

SUMMARY

Technical Problem

In this regard, aiming at the above mentioned technical problems, this disclosure provides a power expanding apparatus for three-phase LLC circuit, which requires minimal modifications to a LLC topology circuit, facilitates low-cost manufacturing and implementation, while is also capable of improving output power, achieving wide-range output, and solving voltage-sharing and/or current-sharing problems.

Solution to the Problem

According to a first aspect, a power expanding apparatus for three-phase LLC circuit, is provided, including a first full-bridge switching network, a second full-bridge switching network, a first resonant network, a second resonant network, a first transformer network, a second transformer network, a first rectifying network, and a second rectifying network; a primary side of the first transformer network is connected with an input voltage sequentially through the first resonant network and the first full-bridge switching network, a secondary side of the first transformer network is connected with a load through the first rectifying network; a primary side of the second transformer network is connected with the input voltage sequentially through the second resonant network and the second full-bridge switching network, and a secondary side of the second transformer network is connected with the load through the second rectifying network;

the first transformer network includes a first transformer unit, a second transformer unit, and a third transformer unit; the second transformer network includes a fourth transformer unit, a fifth transformer unit, and a sixth transformer unit; secondary sides of any two transformer units in the first transformer network are in star-type connection with a secondary side of any one transformer unit in the second transformer network; the first full-bridge switching network includes a first full-bridge switching unit, a second full-bridge switching unit, and a third full-bridge switching unit; the first resonant network includes a first resonant unit, a second resonant unit, and a third resonant unit; the first rectifying network includes a first rectifying unit, a second rectifying unit, and a third rectifying unit; the second full-bridge switching network includes a fourth full-bridge switching unit, a fifth full-bridge switching unit, and a sixth full-bridge switching unit; the second resonant network includes a fourth resonant unit, a fifth resonant unit, and a sixth resonant unit; the second rectifying network includes a fourth rectifying unit, a fifth rectifying unit, and a sixth rectifying unit; the first transformer unit includes a first transformer and a second transformer, the second transformer unit includes a third transformer and a fourth transformer, the third transformer unit includes a fifth transformer and a sixth transformer, the fourth transformer unit includes a seventh transformer and an eighth transformer, the fifth transformer unit includes a ninth transformer and a tenth transformer, the sixth transformer unit includes an eleventh transformer and a twelfth transformer;

a first terminal of a primary side of the first transformer is connected with a first terminal of the first full-bridge switching unit through the first resonant unit, a second terminal of the primary side of the first transformer is connected with a first terminal of a primary side of the second transformer, a second terminal of the primary side of the second transformer is connected with a second terminal of the first full-bridge switching unit, a first terminal of a primary side of the third transformer is connected with a first terminal of the second full-bridge switching unit through the second resonant unit, a second terminal of the primary side of the third transformer is connected with a first terminal of a primary side of the fourth transformer, a second terminal of the primary side of the fourth transformer is connected with a second terminal of the second full-bridge switching unit, a first terminal of a primary side of the fifth transformer is connected with a first terminal of the third full-bridge switching unit through a third resonant unit, a second terminal of the primary side of the fifth transformer is connected with a first terminal of a primary side of the sixth transformer, a second terminal of the primary side of the sixth transformer is connected with a second terminal of the third full-bridge switching unit, a first terminal of a primary side of the seventh transformer is connected with a first terminal of the fourth full-bridge switching unit through the fourth resonant unit, a second terminal of the primary side of the seventh transformer is connected with a first terminal of a primary side of the eighth transformer, a second terminal of the primary side of the eighth transformer is connected with a second terminal of the fourth full-bridge switching unit, a first terminal of a primary side of the ninth transformer is connected with a first terminal of the fifth full-bridge switching unit through the fifth resonant unit, a second terminal of the primary side of the ninth transformer is connected with a first terminal of a primary side of the tenth transformer, a second terminal of the primary side of the tenth transformer is connected with a second terminal of the fifth full-bridge switching unit, a first terminal of a primary side of the eleventh transformer is connected with a first terminal of the sixth full-bridge switching unit through the sixth resonant unit, a second terminal of the primary side of the eleventh transformer is connected with a first terminal of a primary side of the twelfth transformer, a second terminal of the primary side of the twelfth transformer is connected with a second terminal of the sixth full-bridge switching unit;

a first terminal of a secondary side of the first transformer is connected with a first terminal of the first rectifying unit, a first terminal of a secondary side of the second transformer is connected with a second terminal of the first rectifying unit, a first terminal of a secondary side of the third transformer is connected with a first terminal of the second rectifying unit, a first terminal of a secondary side of the fourth transformer is connected with a second terminal of the second rectifying unit, a first terminal of a secondary side of the fifth transformer is connected with a first terminal of the fourth rectifying unit, a first terminal of a secondary side of the sixth transformer is connected with a second terminal of the fourth rectifying unit, a first terminal of a secondary side of the seventh transformer is connected with a first terminal of the third rectifying unit, a first terminal of a secondary side of the eighth transformer is connected with a second terminal of the third rectifying unit, a first terminal of a secondary side of the ninth transformer is connected with a first terminal of the fifth rectifying unit, a first terminal of a secondary side of the tenth transformer is connected with a second terminal of the fifth rectifying unit, a first terminal of a secondary side of the eleventh transformer is connected with a first terminal of the sixth rectifying unit, and a first terminal of a secondary side of the twelfth transformer is connected with a second terminal of the sixth rectifying unit;

a second terminal of the secondary side of the first transformer is connected with a second terminal of the secondary side of the third transformer and a second terminal of the secondary side of the seventh transformer; a second terminal of the secondary side of the second transformer is connected with a second terminal of the secondary side of the fourth transformer and a second terminal of the secondary side of the eighth transformer; a second terminal of the secondary side of the fifth transformer is connected with a second terminal of the secondary side of the ninth transformer and a second terminal of the secondary side of the eleventh transformer; a second terminal of the secondary side of the sixth transformer is connected with a second terminal of the secondary side of the tenth transformer and a second terminal of the secondary side of the twelfth transformer.

Preferably, the first full-bridge switching network and the second full-bridge switching network are connected in series between a first input terminal and a second input terminal; and the first rectifying network and the second rectifying network are connected in parallel between a first output terminal and a second output terminal.

Preferably, the first full-bridge switching network and the second full-bridge switching network are connected in parallel between a first input terminal and a second input terminal; and the first rectifying network and the second rectifying network are connected in parallel between a first output terminal and a second output terminal.

Preferably, the first full-bridge switching network and the second full-bridge switching network are connected in parallel between a first input terminal and a second input terminal; and the first rectifying network and the second rectifying network are connected in series between a first output terminal and a second output terminal.

Preferably, the first full-bridge switching network and the second full-bridge switching network are connected in series between a first input terminal and a second input terminal; and the first rectifying network and the second rectifying network are connected in series between a first output terminal and a second output terminal.

Beneficial Effects

The power expanding apparatus for three-phase LLC circuit according to this disclosure, on one hand makes no significant adjustments or changes to a commonly used LLC half-bridge interleaved topology structure, making it easy to manufacture and implement at low cost, and meanwhile is capable of expanding output power by increasing the output power while achieving a wide-range of output, and on the other hand, achieves, through six resonant cavities, self-voltage-sharing in series and self-current-sharing in parallel, enhancing reliability.

BRIEF DESCRIPTION OF THE DRAWINGS

This disclosure is further explained in conjunction with the accompanying drawings and embodiments.

DESCRIPTION OF THE PREFERRED EMBODIMENTS

In order to make the purpose, technical solution, and advantages of this disclosure clearer, the following provides further detailed explanations of this disclosure in conjunction with the accompanying drawings and embodiments. It should be understood that the specific embodiments described here are only intended to explain this disclosure and are not intended to limit this disclosure.

Figure 1:
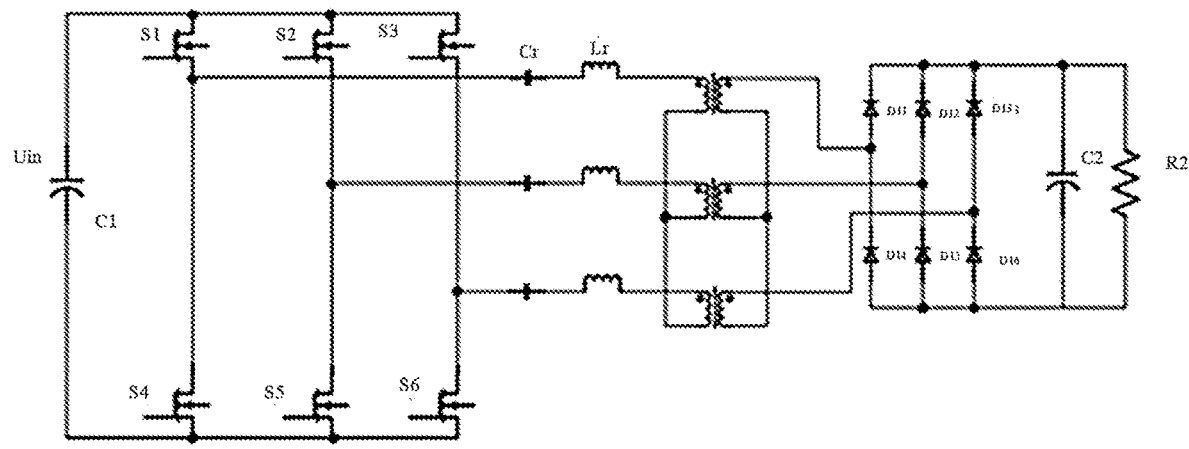
FIG. 1 illustrates a commonly used LLC half-bridge interleaved topology structure.

FIG. 1 illustrates a commonly used LLC half-bridge interleaved topology structure. As shown in FIG. 1, in this topology structure, primary and secondary windings of transformers are respectively in star-type connection. Although this structure can also achieve good current-sharing and voltage-sharing effects, however, when such structure is directly extended to an ultra-high power circuit, the winding connection of the transformers becomes very complex and is difficult to achieve. Moreover, the practical application of the half-bridge structure in a wide-range output voltage brings design difficulties.

On this basis, this disclosure cleverly proposes a power expanding apparatus for three-phase LLC circuit. Based on the LLC half-bridge interleaved topology shown in FIG. 1, a three-phase full-bridge interleaved structure is proposed, including a first full-bridge switching network, a second full-bridge switching network, a first resonant network, a second resonant network, a first transformer network, a second transformer network, a first rectifying network, and a second rectifying network; wherein a primary side of the first transformer network is connected with an input voltage sequentially through the first resonant network and the first full-bridge switching network, a secondary side of the first transformer network is connected with a load through the first rectifying network; a primary side of the second transformer network is connected with the input voltage sequentially through the second resonant network and the second full-bridge switching network, and a secondary side of the second transformer network is connected with the load through the second rectifying network; wherein the first transformer network includes a first transformer unit, a second transformer unit, and a third transformer unit; the second transformer network includes a fourth transformer unit, a fifth transformer unit, and a sixth transformer unit; secondary sides of any two transformer units in the first transformer network are in star-type connection with a secondary side of any one transformer unit in the second transformer network.

The power expanding apparatus for three-phase LLC circuit according to this disclosure, on one hand makes no significant adjustments or changes to a commonly used LLC half-bridge interleaved topology structure, making it easy to manufacture and implement at low cost, and meanwhile is capable of expanding output power by increasing the output power while achieving a wide-range of output, and on the other hand, achieves, through six resonant cavities, self-voltage-sharing in series and self-current-sharing in parallel, enhancing reliability.

Figure 2:
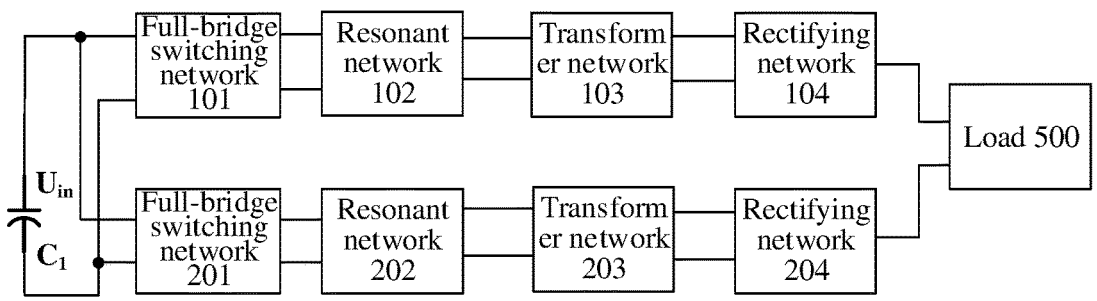
FIG. 2 is a block diagram of a power expanding apparatus for three-phase LLC circuit according to a first preferred embodiment of this disclosure.

FIG. 2 is a block diagram of a power expanding apparatus for three-phase LLC circuit according to a first preferred embodiment of this disclosure. As shown in FIG. 2, a power expanding apparatus for three-phase LLC circuit, is provided, including a full-bridge switching network 101, a full-bridge switching network 201, a resonant network 102, a resonant network 202, a transformer network 103, a transformer network 203, a rectifying network 104, and a rectifying network 204. A primary side of the transformer network 103 is connected with an input voltage Uin sequentially through the resonant network 102 and the full-bridge switching network 101, a secondary side of the transformer network 103 is connected with a load 500 through the rectifying network 104. A primary side of the transformer network 203 is connected with the input voltage Uin sequentially through the resonant network 202 and the full-bridge switching network 201, and a secondary side of the transformer network 203 is connected with the load 500 through the rectifying network 204. In a preferred embodiment shown in FIG. 2, the input voltage Uin can be a voltage across an input capacitor C1, wherein two terminals of the input capacitor C1 form a first input terminal and a second input terminal, and two terminals of the load 500 form a first output terminal and a second output terminal.

The transformer network 103 includes a first transformer unit, a second transformer unit, and a third transformer unit; the transformer network 203 includes a fourth transformer unit, a fifth transformer unit, and a sixth transformer unit. Each transformer unit can include one transformer, or two transformers with their primary windings connected in series, or multiple transformers with their primary windings connected in series. Secondary sides of any two transformer units in the transformer network 103 are in star-type connection with a secondary side of any one transformer unit in the transformer network 203. For example, a secondary side of the first transformer unit and a secondary side of the second transformer unit are in star-type connection with a secondary side of the fourth transformer unit; and/or a secondary side of the third transformer unit and a secondary side of the fifth transformer unit are in star-type connection with a secondary side of the sixth transformer unit. Of course, other suitable connection methods can also be used, as long as they can satisfy the star-type connection between secondary sides of any two transformer units in the transformer network 103 and a secondary side of any one transformer unit in the transformer network 203.

In a preferred embodiment of this disclosure, the full-bridge switching network 101 and the full-bridge switching network 201 are connected in series between the first input terminal and the second input terminal; and the rectifying network 104 and the rectifying network 204 are connected in parallel between the first output terminal and the second output terminal. In another preferred embodiment of this disclosure, the full-bridge switching network 101 and the full-bridge switching network 201 are connected in parallel between the first input terminal and the second input terminal; and the rectifying network 104 and the rectifying network 204 are connected in parallel between the first output terminal and the second output terminal. In another preferred embodiment of this disclosure, the full-bridge switching network 101 and the full-bridge switching network 201 are connected in parallel between the first input terminal and the second input terminal; and the rectifying network 104 and the rectifying network 204 are connected in series between the first output terminal and the second output terminal. In another preferred embodiment of this disclosure, the full-bridge switching network 101 and the full-bridge switching network 201 are connected in series between the first input terminal and the second input terminal; and the rectifying network 104 and the rectifying network 204 are connected in series between the first output terminal and the second output terminal.

In a preferred embodiment of this disclosure, the first transformer unit, the second transformer unit, the third transformer unit, the fourth transformer unit, the fifth transformer unit and the sixth transformer unit respectively include a first transformer, a second transformer, a third transformer, a fourth transformer, a fifth transformer, and a sixth transformer. That is, the transformer network 103 and the transformer network 203 respectively include three transformers. Therefore, correspondingly, the full-bridge switching network 101 and the full-bridge switching network 102 respectively include a three-phase full-bridge switching unit, namely three full-bridge switching units; and the resonant network 102 and the resonant network 202 respectively include a three-phase resonant unit, namely three resonant units; the rectifying network 104 and the rectifying network 204 respectively include a three-phase rectifying unit, namely three rectifying units, and each rectifying unit includes two rectifying diodes. In another preferred embodiment of this disclosure, the first transformer unit, the second transformer unit, the third transformer unit, the fourth transformer unit, the fifth transformer unit and the sixth transformer unit respectively includes two transformers with their primary sides connected in series. That is, the transformer network 103 and the transformer network 203 respectively include six transformers. Therefore, correspondingly, the full-bridge switching network 101 and the full-bridge switching network 102 respectively include a three-phase full-bridge switching unit, namely three full-bridge switching units; the resonant network 102 and the resonant network 202 respectively include a three-phase resonant unit, namely three resonant units; the rectifying network 104 and the rectifying network 204 respectively include a three-phase rectifying unit, namely three rectifying units, and each rectifying unit includes four rectifying diodes.

This disclosure creatively optimizes the original star-type connection on secondary sides of transformer units in the same resonant network, to be a star-type connection between secondary sides of any two transformer units in one three-phase resonant network and a secondary side of one transformer unit in another three-phase resonant network, thereby forming an interconnection between the two resonant networks. This allows for hardware voltage-sharing and current-sharing when the input and output are connected in series and parallel, respectively. The star-type connection mentioned here is a commonly used term in the industry, also known as Y-type connection, which is a shape of connection between secondary windings of transformers and corresponding rectifying circuits, after the connection circuit is stretched. Furthermore, the ideas provided by this disclosure can be expanded based on the number of transformers. The expanding of transformer makes the transformer design easier and the layout more convenient, and further makes a selection for a type of switching devices in the rectifying network to be easier.

Figure 3:
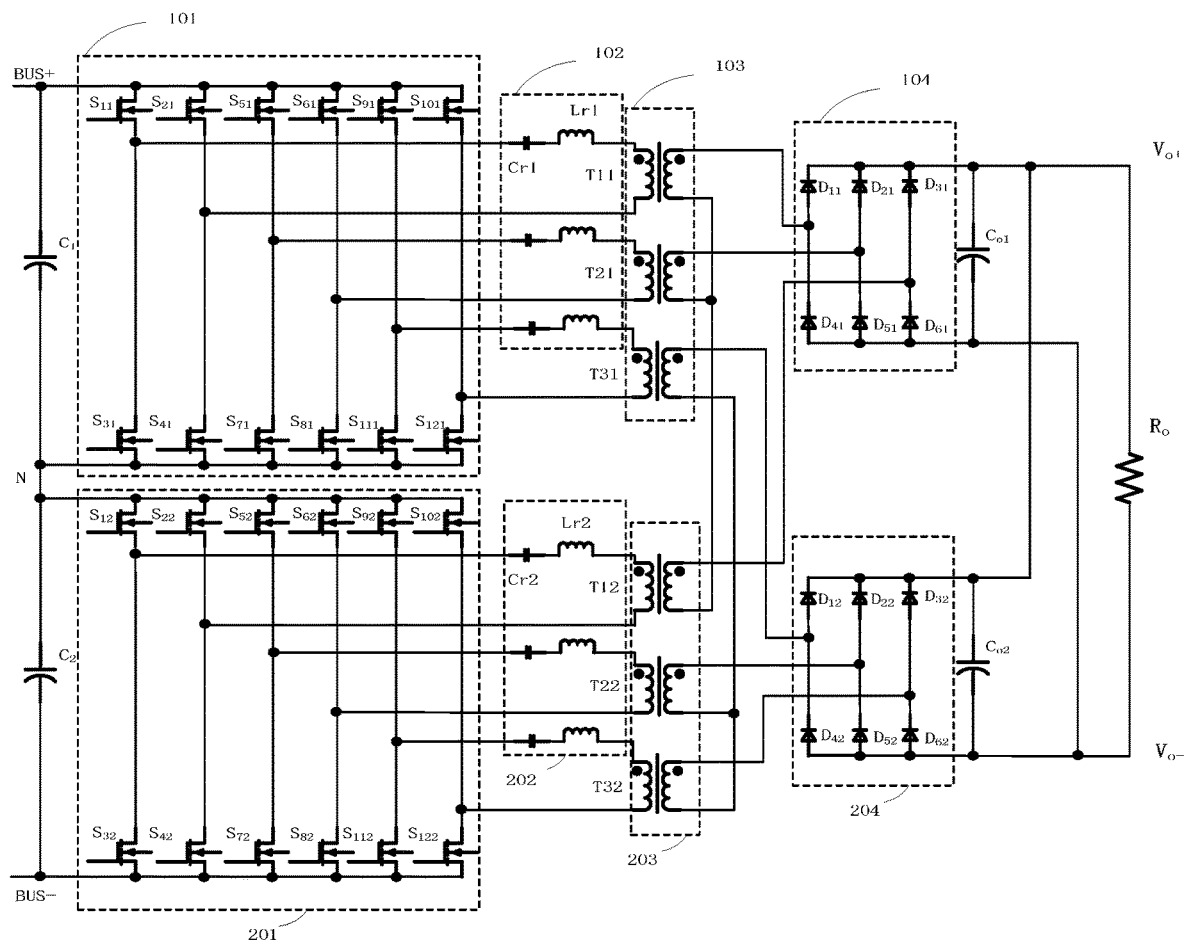
FIG. 3 is a circuit diagram of a power expanding apparatus for three-phase LLC circuit according to a second preferred embodiment of this disclosure.

FIG. 3 is a circuit diagram of a power expanding apparatus for three-phase LLC circuit according to a second preferred embodiment of this disclosure. FIG. 3 shows an embodiment in which two resonant networks are connected in series at the input terminals, while two rectifying networks are connected in parallel at the output terminals. As shown in FIG. 3, the power expanding apparatus for three-phase LLC circuit of this disclosure includes a full-bridge switching network 101, a full-bridge switching network 201, a resonant network 102, a resonant network 202, a transformer network 103, a transformer network 203, a rectifying network 104, and a rectifying network 204. A primary side of the transformer network 103 is connected with positive bus BUS+ and N line sequentially through the resonant network 102 and the full-bridge switching network 101, a secondary side of the transformer network 103 is connected with an output positive terminal Vo+ and an output negative terminal Vo– through the rectifying network 104. A primary side of the transformer network 203 is connected with the N line and negative bus BUS– sequentially through the resonant network 202 and the full-bridge switching network 201; a secondary side of the transformer network 203 is connected with the output positive terminal Vo+ and the output negative terminal Vo– through the rectifying network 204. That is, in this embodiment, the full-bridge switching network 101 and the full-bridge switching network 201 are connected in series between the positive bus BUS+ and the negative bus BUS–, while the rectifying network 104 and the rectifying network 204 are connected in parallel between the output positive terminal Vo+ and the output negative terminal Vo–. A load Ro is connected between the output positive terminal Vo+ and the output negative terminal Vo–.

In this preferred embodiment, the full-bridge switching network 101 includes a first full-bridge switching unit, a second full-bridge switching unit, and a third full-bridge switching unit, wherein the first full-bridge switching unit includes switching tubes S11, S21, S31, and S41; the second full-bridge switching unit includes switching tubes S51, S61, S71, and S81; and the third full-bridge switching unit includes switching tubes S91, S101, S111, and S121. The resonant network 102 includes a first resonant unit, a second resonant unit, and a third resonant unit, wherein each resonant unit respectively includes a capacitor Cr1 and an inductor Lr1, which are connected in series. The resonant network 202 includes a fourth resonant unit, a fifth resonant unit, and a sixth resonant unit, wherein each resonant unit respectively includes a capacitor Cr2 and an inductor Lr2, which are connected in series. The first transformer unit, the second transformer unit, the third transformer unit, the fourth transformer unit, the fifth transformer unit and the sixth transformer unit respectively include a first transformer, a second transformer, a third transformer, a fourth transformer, a fifth transformer, and a sixth transformer, namely transformers T11, T21, T31, T12, T22, T32. The rectifying network 104 includes a first rectifying unit, a second rectifying unit, and a third rectifying unit, wherein the first rectifying unit includes diodes D11 and D41, the second rectifying unit includes diodes D21 and D51, and the third rectifying unit includes diodes D31 and D61. The rectifying network 204 includes a fourth rectifying unit, a fifth rectifying unit, and a sixth rectifying unit, wherein the fourth rectifying unit includes diodes D12 and D42, the fourth rectifying unit includes diodes D22 and D52, and the sixth rectifying unit includes diodes D32 and D62. In the preferred embodiment shown in FIG. 3, the power expanding apparatus for three-phase LLC circuit further includes input capacitors C1, C2, and output capacitors Co1, Co2. A main function of the resonant network 102 and the resonant network 202 is for LLC series resonance, so as to achieve soft switching of switching devices. The transformer network 103 and the transformer network 203 are responsible for isolation and voltage transformation regulation. The rectifying network 104 and the rectifying network 204 are responsible for power rectification.

As shown in FIG. 3, a first terminal of a primary side of transformer T11 is connected with a first terminal of the first full-bridge switching unit (i.e., a source of switching tube S11 and a drain of switching tube S31) through the first resonant unit. A second terminal of the primary side of transformer T11 is connected with a second terminal of the first full-bridge switching unit (i.e., a source of switching tube S21 and a drain of switching tube S21). A first terminal of a primary side of transformer T21 is connected with a first terminal of the second full-bridge switching unit (i.e., a source of switching tube S51 and a drain of switching tube S71) through the second resonant unit. A second terminal of the primary side of transformer T21 is connected with a second terminal of the second full-bridge switching unit (i.e., a source of switching tube S61 and a drain of switching tube S81). A first terminal of a primary side of transformer T31 is connected with a first terminal of the third full-bridge switching unit (i.e., a source of switching tube S91 and a drain of switching tube S111) through the third resonant unit. A second terminal of the primary side of transformer T31 is connected with a second terminal of the third full-bridge switching unit (i.e., a source of switching tube S101 and a drain of switching tube S121). A first terminal of a primary side of transformer T12 is connected with a first terminal of the fourth full-bridge switching unit (i.e., a source of switching tube S12 and a drain of switching tube S32) through the fourth resonant unit. A second terminal of the primary side transformer T12 is connected with a second terminal of the fourth full-bridge switching unit (i.e., a source of switching tube S22 and a drain of switching tube S42). A first terminal of a primary side of transformer T22 is connected with a first terminal of the fifth full-bridge switching unit (i.e., a source of switching tube S52 and a drain of switching tube S72) through the fifth resonant unit. A second terminal of the primary side of transformer T22 is connected with a second terminal of the fifth full-bridge switching unit (i.e., a source of switching tube S62 and a drain of switching tube S82) through the fifth resonant unit. A first terminal of a primary side of transformer T32 is connected with a first terminal of a sixth full-bridge switching unit (i.e., a source of switching tube S92 and a drain of switching tube S112) through the sixth resonant unit. A second terminal of the primary side of transformer T32 is connected with a second terminal of the sixth full-bridge switching unit (i.e., a source of switching tube S102 and a drain of switching tube S122). Gates of the aforementioned switching tubes are connected with control signals. The drains of switching tubes S11, S21, S51, S61, S91, and S101 are connected with the positive bus BUS+, the sources of switching tubes S31, S41, S71, S81, S111, and S121 are connected with the N line, the drains of switching tubes S12, S22, S52, S62, S92, and S102 are connected with the N line, and the sources of switching tubes S32, S42, S72, S82, S112, and S222 are connected with the negative bus BUS−. The input capacitor C1 is connected between the positive bus BUS+ and the N line, and the input capacitor C2 is connected between the N line and the negative bus BUS−. In this disclosure, the switching tubes used include but are not limited to SiMOS, IGBT, GaN MOS, SiC MOS, etc.

A first terminal of a secondary side of transformer T11 is connected with a first terminal of the first rectifying unit (i.e., an anode of diode D11 and a cathode of diode D41); a first terminal of a secondary side of transformer T21 is connected with a first terminal of the second rectifying unit (i.e., an anode of diode D21 and a cathode of diode D51); a first terminal of a secondary side of transformer T31 is connected with a first terminal of the fourth rectifying unit (i.e., an anode of diode D12 and a cathode of diode D42); a first terminal of a secondary side of transformer T12 is connected with a first terminal of the third rectifying unit (i.e., an anode of diode D31 and a cathode of diode D61); a first terminal of a secondary side of transformer T22 is connected with the fifth rectifying unit (i.e., an anode of diode D22 and a cathode of diode D52); a first terminal of a secondary side of transformer T32 is connected with a first terminal of the sixth rectifying unit (i.e., an anode of diode D32 and a cathode of diode D62). A second terminal of the secondary side of transformer T11 is connected with a second terminal of the secondary side of transformer T21 and a second terminal of the secondary side of transformer T12; a second terminal of the secondary side of transformer T31 is connected with a second terminal of the secondary side of transformer T22 and a second terminal of the secondary side of transformer T32. Cathodes of diodes D11, D21, and D31, as well as cathodes of diodes D12, D22, and D32, are connected with the output positive terminal Vo+; while anodes of diodes D41, D51, and D61, as well as anodes of diodes D42, D52, and D62, are connected with the output negative terminal Vo−. The output capacitors Co1 and Co2 are connected between the output positive terminal Vo+ and the output negative terminal Vo−, respectively.

In another preferred embodiment of this disclosure, the diode rectifying network can also be replaced by a switching tube rectifying network. Herein, the rectifying network 104 and the rectifying network 204 can use SiMOS, IGBT, GaN MOS, SiC MOS, Schottky diode, SIC diode, etc.

In this preferred embodiment, the full-bridge switching network 101 and the full-bridge switching network 201 are connected in series between the positive bus BUS+ and the negative bus BUS−, and the rectifying network 104 and the rectifying network 204 are connected in parallel between the output positive terminal Vo+ and the output negative terminal Vo−. The second terminal of the secondary side of transformer T11 in the transformer network 103 is respectively connected with the second terminal of the secondary side of transformer T21 in the transformer network 103 and the second terminal of the secondary side of transformer T12 in the transformer network 203; and the second terminal of the secondary side of transformer T31 in the transformer network 103 is respectively connected with the second terminal of the secondary side of transformer T22 in the transformer network 203 and the second terminal of the secondary side of transformer T32 in the transformer network 203. As the secondary sides of any two transformers of the transformer network 103 are in a star-type connection with a secondary side of any one transformer in the transformer network 203, it ensures that the full-bridge switching network 101 and the full-bridge switching network 201 can be connected in series to achieve voltage-sharing, and the rectifying network 104 and the rectifying network 204 can be connected in parallel to achieve current-sharing.

This disclosure provides a power expanding apparatus for three-phase LLC circuit. On the basis of the original three-phase half-bridge interleaved LLC structure, an innovative topology improvement idea for three-phase full-bridge interleaved LLC is proposed, so as to provide a three-phase full-bridge interleaved structure, which on the one hand, is capable of expanding output power, which is more suitable for a wide-range of power output, and on the other hand, through the change of the star-type connection at the secondary sides of transformers, enables each phase of the topology to have strong self-voltage-sharing and strong self-current-sharing abilities, simplifies hardware design and improves reliability. As the six resonant cavities are capable of achieving self-voltage-sharing in series and achieving self-current-sharing in parallel, reliability of the circuit is enhanced and hardware design is simplified.

The power expanding apparatus for three-phase LLC circuit according to this disclosure, on one hand makes no significant adjustments or changes to a commonly used LLC half-bridge interleaved topology structure, making it easy to manufacture and implement at low cost, and meanwhile is capable of expanding output power by increasing the output power while achieving a wide-range of output, and on the other hand, achieves, through six resonant cavities, self-voltage-sharing in series and self-current-sharing in parallel, enhancing reliability.

Figure 4:
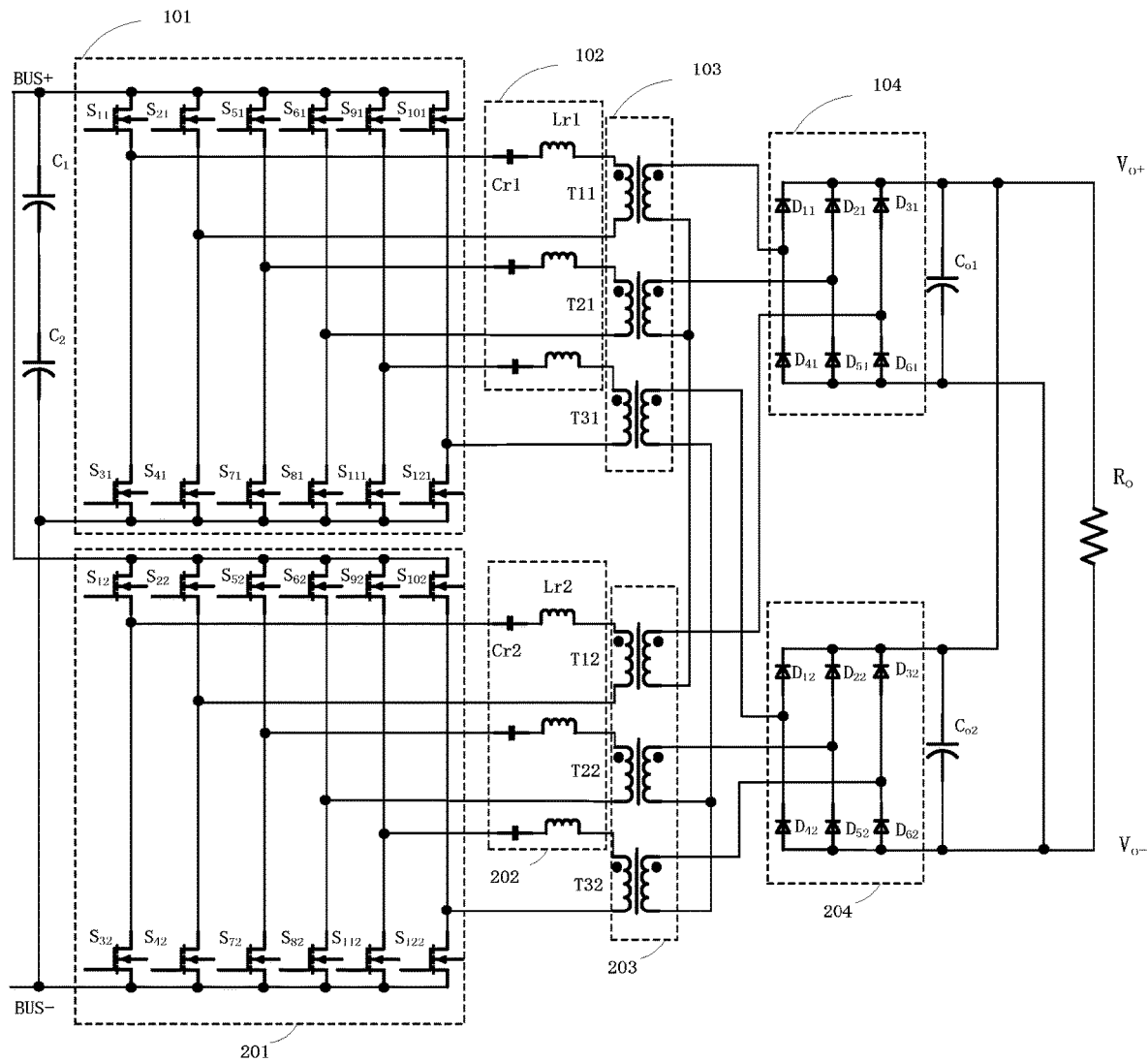
FIG. 4 is a circuit diagram of a power expanding apparatus for three-phase LLC circuit according to a third preferred embodiment of this disclosure.

FIG. 4 is a circuit diagram of a power expanding apparatus for three-phase LLC circuit according to a third preferred embodiment of this disclosure. FIG. 4 shows an embodiment in which two resonant networks are connected in parallel at the input terminals, while two rectifying networks are connected in parallel at the output terminals. Therefore, in the preferred embodiment shown in FIG. 4, the full-bridge switching network 101 and the full-bridge switching network 201 are connected in parallel between the positive bus BUS+ and the negative bus BUS−, and the rectifying network 104 and the rectifying network 204 are connected in parallel between the output positive terminal Vo+ and output negative terminal Vo−.

The connection relationship of the embodiment shown in FIG. 4 is similar to that shown in FIG. 3, except that drains of switching tubes S11, S21, S51, S61, S91, and S101 are connected with the positive bus BUS+, and sources of switching tubes S31, S41, S71, S81, S111, and S121 are connected with the negative bus BUS−; drains of switching tubes S12, S22, S52, S62, S92, and S102 are connected with the positive busbar BUS+, while sources of switching tubes S32, S42, S72, S82, S112, and S222 are connected with the negative busbar BUS−; and the input capacitors C1 and C2 are connected in series between the positive bus BUS+ and the negative bus BUS−.

In this preferred embodiment, the full-bridge switching network 101 and the full-bridge switching network 201 are connected in parallel between the positive bus BUS+ and the negative bus BUS−, and the rectifying network 104 and the rectifying network 204 are connected in parallel between the output positive terminal Vo+ and the output negative terminal Vo−. The second terminal of the secondary side of transformer T11 in the transformer network 103 is respectively connected with the second terminal of the secondary side of transformer T21 in the transformer network 103 and the second terminal of the secondary side of transformer T12 in the transformer network 203; and the second terminal of the secondary side of transformer T31 in the transformer network 103 is respectively connected with the second terminal of the secondary side of transformer T22 in the transformer network 203 and the second terminal of the secondary side of transformer T32 in the transformer network 203. As the secondary sides of any two transformers of the transformer network 103 are in a star-type connection with a secondary side of any one transformer in the transformer network 203, it ensures that the full-bridge switching network 101 and the full-bridge switching network 201 can be connected in parallel to achieve current-sharing, and the rectifying network 104 and the rectifying network 204 can be connected in parallel to achieve current-sharing.

Figure 5:
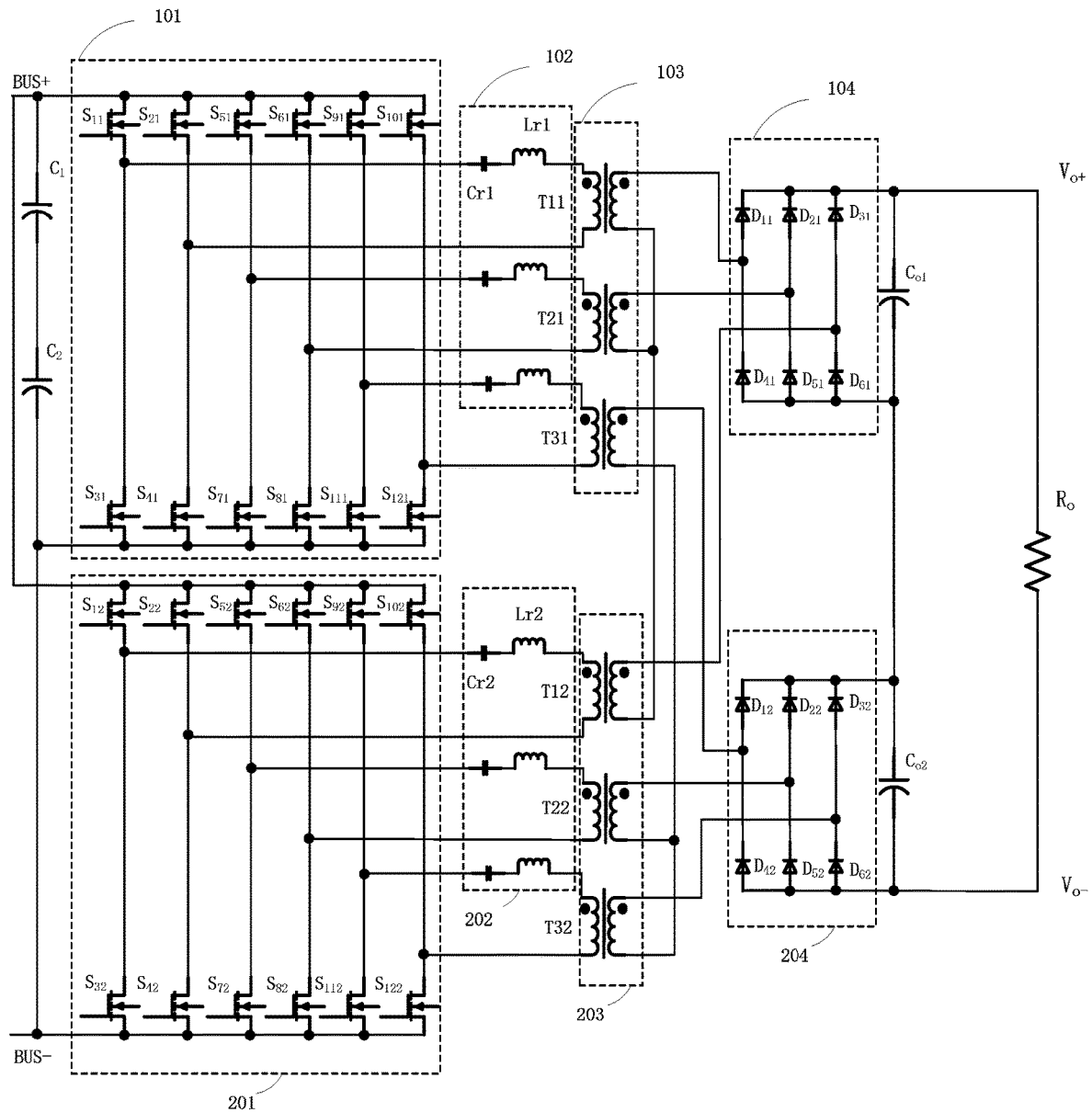
FIG. 5 is a circuit diagram of a power expanding apparatus for three-phase LLC circuit according to a fourth preferred embodiment of this disclosure.

FIG. 5 is a circuit diagram of a power expanding apparatus for three-phase LLC circuit according to a fourth preferred embodiment of this disclosure. FIG. 5 shows an embodiment in which two resonant networks are connected in parallel at the input terminals, while two rectifying networks are connected in series at the output terminals. Therefore, in the preferred embodiment shown in FIG. 5, the full-bridge switching network 101 and the full-bridge switching network 201 are connected in parallel between the positive bus BUS+ and the negative bus BUS−, and the rectifying network 104 and the rectifying network 204 are connected in series between the output positive terminal Vo+ and output negative terminal Vo−. The specific connection relationship of the input portion of the power expanding apparatus can refer to in FIG. 4, and is not repeated here. The connection relationship of the output portion of the power expanding apparatus is similar to that shown in FIG. 3, except that cathodes of diodes D11, D21, and D31 are connected with the first terminal of the output capacitor Co1 and the output positive terminal Vo+; the second terminal of the output capacitor Co1 is connected with the first terminal of the output capacitor Co2, as well as the anodes of diodes D41, D51, and D61 and the cathodes of diodes D12, D22, and D32; the anodes of diodes D42, D52, and D62 are connected with the output negative terminal Vo− and the second terminal of the output capacitor Co2.

In this preferred embodiment, the full-bridge switching network 101 and the full-bridge switching network 201 are connected in parallel between the positive bus BUS+ and the negative bus BUS−, the rectifying network 104 and the rectifying network 204 are connected in series between the output positive terminal Vo+ and the output negative terminal Vo−. The second terminal of the secondary side of transformer T11 in the transformer network 103 is connected with the second terminal of the secondary side of transformer T21 in the transformer network 103 and the second terminal of the secondary side of transformer T12 in the transformer network 203; and the second terminal of the secondary side of transformer T31 is connected with the second terminal of the secondary side of transformer T22 in the transformer network 203 and the second terminal of the secondary side of transformer T32 in the transformer network 203. As the secondary sides of any two transformers of the transformer network 103 are in a star-type connection with a secondary side of any one transformer in the transformer network 203, it ensures that the full-bridge switching network 101 and the full-bridge switching network 201 can be connected in parallel to achieve current-sharing, and the rectifying network 104 and the rectifying network 204 can be connected in series to achieve voltage-sharing.

Figure 6:
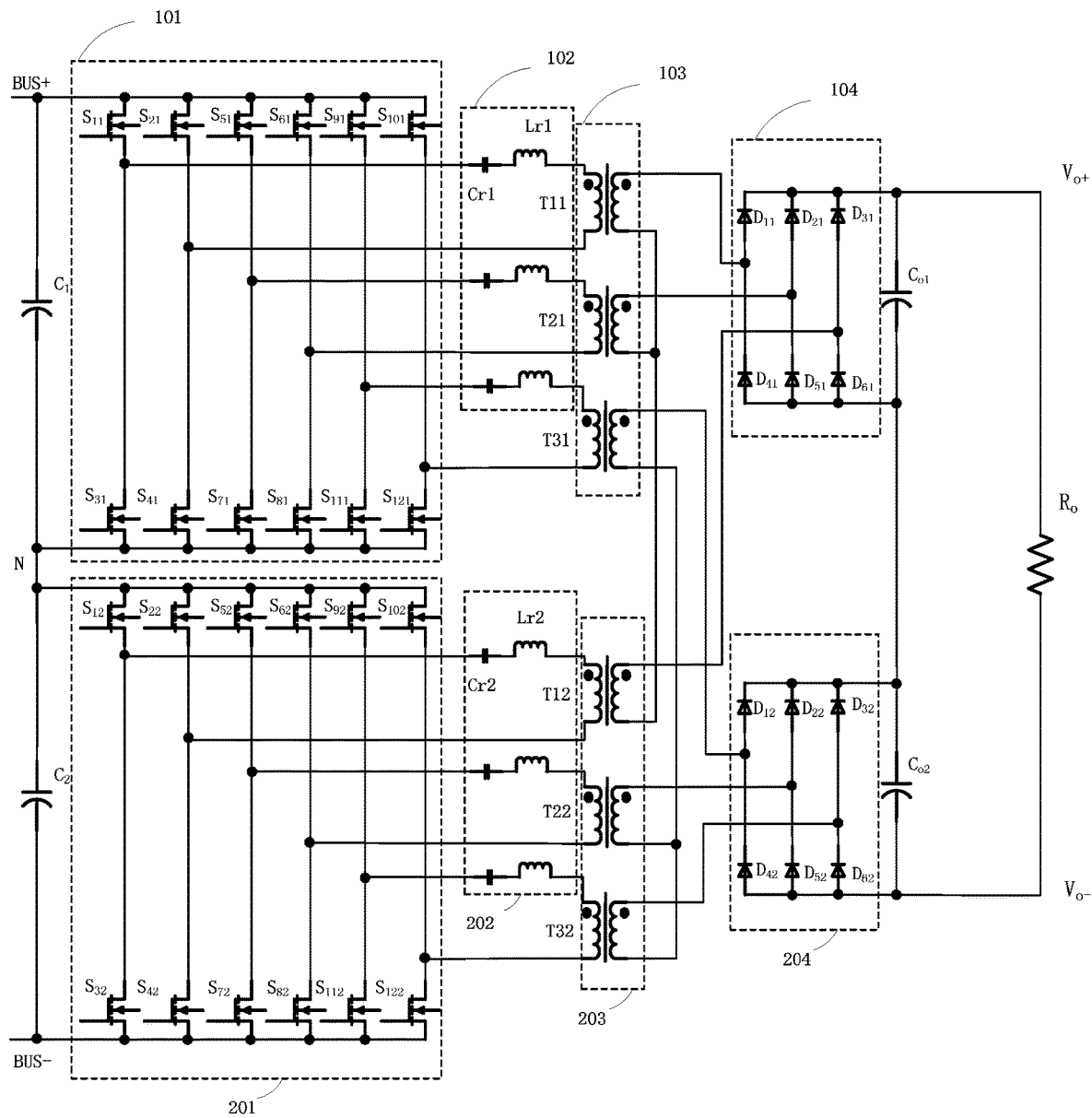
FIG. 6 is a circuit diagram of a power expanding apparatus for three-phase LLC circuit according to a fifth preferred embodiment of this disclosure.

FIG. 6 is a circuit diagram of a power expanding apparatus for three-phase LLC circuit according to a fifth preferred embodiment of this disclosure. FIG. 6 shows an embodiment in which two resonant networks are connected in series at the input terminals, while two rectifying networks are connected in series at the output terminals. Therefore, in the preferred embodiment shown in FIG. 6, the full-bridge switching network 101 and the full-bridge switching network 201 are connected in series between the positive bus BUS+ and the negative bus BUS−, and the rectifying network 104 and the rectifying network 204 are connected in series between the output positive terminal Vo+ and output negative terminal Vo−. The specific connection relationship of the input portion and the output portion of the power expanding apparatus can refer to FIG. 3 and FIG. 5 respectively, and is not elaborated here.

In this preferred embodiment, the full-bridge switching network 101 and the full-bridge switching network 201 are connected in series between the positive bus BUS+ and the negative bus BUS−, the rectifying network 104 and the rectifying network 204 are connected in series between the output positive terminal Vo+ and output negative terminal Vo−. The second terminal of the secondary side of transformer T11 in the transformer network 103 is connected with the second terminal of the secondary side of transformer T21 in the transformer network 103 and the second terminal of the secondary side of transformer T12 in the transformer network 203; and the second terminal of the secondary side of transformer T31 in the transformer network 103 is connected with the second terminal of the secondary side of transformer T22 in the transformer network 203 and the second terminal of the secondary side of transformer T32 in the transformer network 203. As the secondary sides of any two transformers of the transformer network 103 are in a star-type connection with a secondary side of any one transformer in the transformer network 203, it ensures that the full-bridge switching network 101 and the full-bridge switching network 201 can be connected in series to achieve voltage-sharing, and the rectifying network 104 and the rectifying network 204 can be connected in series to achieve voltage-sharing.

Figure 7:
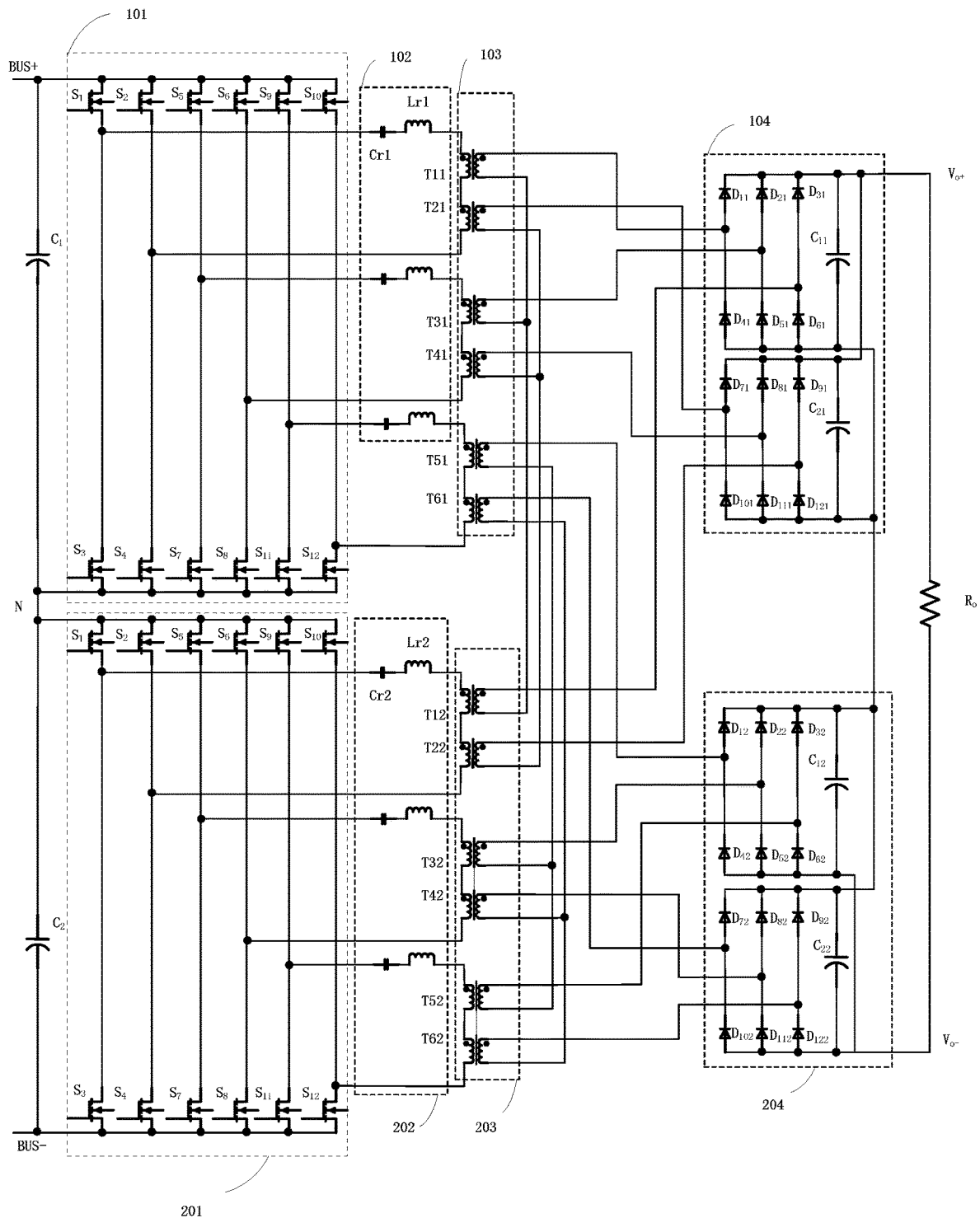
FIG. 7 is a circuit diagram of a power expanding apparatus for three-phase LLC circuit according to a sixth preferred embodiment of this disclosure.

FIG. 7 is a circuit diagram of a power expanding apparatus for three-phase LLC circuit according to a sixth preferred embodiment of this disclosure. In the preferred embodiment shown in FIG. 7, just similar as the design method adopted in FIG. 6, the full-bridge switching network 101 and the full-bridge switching network 201 are connected in series between the positive bus BUS+ and the negative bus BUS−, and the rectifying network 104 and the rectifying network 204 are connected in series between the output positive terminal Vo+ and output negative terminal Vo−. The difference between the embodiment shown in FIG. 7 and the embodiment shown in FIG. 6 is that each transformer unit includes two transformers with their primary sides connected in series, which expands the number of transformers from the original 6 to 12. Therefore, the corresponding rectifying units respectively include four rectifying tubes, that is, the rectifying network 104 and the rectifying network 204 are composed of two three-phase bridge rectifying circuits which are connected in parallel, that is, the first rectifying unit includes diodes D11, D41, D71, and D101, the second rectifying unit includes diodes D21, D51, D81, and D111, and the third rectifying unit includes diodes D31, D61, D91, and D121. The rectifying network 204 includes a fourth rectifying unit, a fifth rectifying unit, and a sixth rectifying unit, wherein the fourth rectifying unit includes diodes D12, D42, D72, and D102, the fifth rectifying unit includes diodes D22, D52, D82, and D112, and the sixth rectifying unit includes diodes D32, D62, D92, and D122.

As shown in FIG. 7, the transformer network 103 includes transformers T11, T21, T31, T41, T51, T61, T12, T22, T32, T42, T52, T62. Similar to the embodiment shown in FIG. 6, the first terminal of the primary side of transformer T11 is connected with the first terminal of the first full-bridge switching unit through the first resonant unit, the second terminal of the primary side of transformer T11 is connected with the first terminal of the primary side of transformer T21, the second terminal of the primary side of transformer T21 is connected with the second terminal of the first full-bridge switching unit, the first terminal of the primary side of transformer T31 is connected with the first terminal of the second full-bridge switching unit through the second resonant unit, the second terminal of the primary side of transformer T31 is connected with the first terminal of the primary side of transformer T41. The second terminal of the primary side of transformer T41 is connected with the second terminal of the second full-bridge switching unit. The first terminal of the primary side of transformer T51 is connected with the first terminal of the third full-bridge switching unit through the third resonant unit, the second terminal of the primary side of transformer T51 is connected with the first terminal of the primary side of transformer T61, and the second terminal of the primary side of transformer T61 is connected with the second terminal of the third full-bridge switching unit. The first terminal of the primary side of transformer T12 is connected with the first terminal of the fourth full-bridge switching unit through the fourth resonant unit, the second terminal of the primary side of transformer T12 is connected with the first terminal of the primary side of transformer T22. The second terminal of the primary side of transformer T22 is connected with the second terminal of the fourth full-bridge switching unit, the first terminal of the primary side of transformer T32 is connected with the first terminal of the fifth full-bridge switching unit through the fifth resonant unit. The second terminal of the primary side of transformer T32 is connected with the first terminal of the primary side of transformer T42, and the second terminal of the primary side of transformer T42 is connected with the second terminal of the fifth full-bridge switching unit. The first terminal of the primary side of transformer T52 is connected with the first terminal of the sixth full-bridge switching unit through the sixth resonant unit, and the second terminal of the primary side of transformer T52 is connected with the first terminal of the primary side of transformer T62. The second terminal of the primary side of transformer T62 is connected with the second terminal of the sixth full-bridge switching unit. The construction of the first, second, third, fourth, fifth, and sixth full-bridge switching units can refer to the embodiment shown in FIG. 6, and is not repeated here.

The first terminal of the secondary side of transformer T11 is connected with the first terminal of the first rectifying unit (i.e., an anode of diode D11 and a cathode of diode D41), the first terminal of the secondary side of transformer T21 is connected with the second terminal of the first rectifying unit (i.e., an anode of diode D71 and a cathode of diode D101), the first terminal of the secondary side of transformer T31 is connected with the first terminal of the second rectifying unit (i.e., an anode of diode D21 and a cathode of diode D51), the first terminal of the secondary side of transformer T41 is connected with the second terminal of the second rectifying unit (i.e., an anode of diode D81 and a cathode of diode D111), the first terminal of the secondary side of transformer T51 is connected with the first terminal of the fourth rectifying unit (i.e., an anode of diode D12 and a cathode of diode D42), the first terminal of the secondary side of transformer T61 is connected with the second terminal of the fourth rectifying unit (i.e., an anode of diode D7 and a cathode of diode D102), the first terminal of the secondary side of transformer T12 is connected with the first terminal of the third rectifying unit (i.e., an anode of diode D31 and a cathode of diode D61), the first terminal of the secondary side of transformer T22 is connected with the second terminal of the third rectifying unit (i.e., an anode of diode D91 and a cathode of diode D121), the first terminal of the secondary side of transformer T32 is connected with the first terminal of the fifth rectifying unit (i.e., an anode of diode D22 and a cathode of diode D52), the first terminal of the secondary side of transformer T42 is connected with the second terminal of the fifth rectifying unit (i.e., an anode of diode D82 and a cathode of diode D112), the first terminal of the secondary side of transformer T52 is connected with the first terminal of the sixth rectifying unit (i.e., an anode of diode D32 and a cathode of diode D62), and the first terminal of the secondary side of transformer T62 is connected with the first terminal of the sixth rectifying unit (i.e., an anode of diode D32 and a cathode of diode D62), the first terminal of the secondary side of transformer T62 is connected with the second terminal of the sixth rectifying unit (i.e., an anode of diode D92 and a cathode of diode D122).

The second terminal of the secondary side of transformer T11 is connected with the second terminal of the secondary side of transformer T31 and the second terminal of the secondary side of transformer T12. The second terminal of the secondary side of transformer T21 is connected with the second terminal of the secondary side of transformer T41 and the second terminal of the secondary side of transformer T22. The second terminal of the secondary side of transformer T51 is connected with the second terminal of the secondary side of transformer T32 and the second terminal of the secondary side of transformer T52. The second terminal of the secondary side of transformer T61 is connected with the second terminal of the secondary side of transformer T42 and the second terminal of the secondary side of transformer T62.

Similar to the preferred embodiment shown in FIG. 6, secondary sides of any two groups of transformers in the transformer network 103 with their primary sides connected in series are in a star-type connection with secondary sides of any one group of transformers in the transformer network 203 with their primary sides connected in series, so as to ensure that the full-bridge switching network 101 and the full-bridge switching network 201 can be connected in series to achieve voltage-sharing, and the rectifying network 104 and the rectifying network 204 can be connected in series to achieve voltage-sharing.

In further preferred embodiments of this disclosure, the circuit can also be designed as shown in FIG. 3, wherein the full-bridge switching network 101 and the full-bridge switching network 201 are connected in series between the positive bus BUS+ and the negative bus BUS−, while the rectifying network 104 and the rectifying network 204 are connected in parallel between the output positive terminal Vo+ and the output negative terminal Vo−, so as to ensure that the full-bridge switching network 101 and the full-bridge switching network 201 can be connected in series to achieve voltage-sharing, and the rectifying network 104 and the rectifying network 204 can be connected in parallel to achieve current-sharing. In further preferred embodiments of this disclosure, the circuit can also be designed as shown in FIG. 4, wherein the full-bridge switching network 101 and the full-bridge switching network 201 are connected in parallel between the positive bus BUS+ and the negative bus BUS−, and the rectifying network 104 and the rectifying network 204 are connected in parallel between the output positive terminal Vo+ and the output negative terminal Vo−, so as to ensure that the full-bridge switching network 101 and the full-bridge switching network 201 can be connected in parallel to achieve current-sharing, and the rectifying network 104 and the rectifying network 204 can be connected in parallel to achieve current-sharing. In further preferred embodiments of this disclosure, the circuit can also be designed as shown in FIG. 5, wherein the full-bridge switching network 101 and the full-bridge switching network 201 are connected in parallel between the positive bus BUS+ and negative bus BUS−, and the rectifying network 104 and the rectifying network 204 are connected in series between the output positive terminal Vo+ and output negative terminal Vo−, so as to ensure that the full-bridge switching network 101 and the full-bridge switching network 201 can be connected in parallel to achieve current-sharing, and the rectifying network 104 and the rectifying network 204 can be connected in series to achieve voltage-sharing.

Based on the teachings of this disclosure, those skilled in the art are able to construct these structures in real time, which are not repeated here. Furthermore, this group of embodiments can expand the number of transformers, thereby further expanding and improving the output power, and being suitable for achieving a wide-range output.

Although this disclosure is described through specific embodiments, those skilled in the art should understand that various transformations and equivalent substitutions can be made to this disclosure without departing from the scope of this disclosure. In addition, various modifications can be made to this disclosure for specific situations or materials without departing from the scope of this disclosure. Therefore, this disclosure is not limited to the disclosed specific embodiments but should include all embodiments falling within the scope of the claims of this disclosure.

The above is only preferred embodiments of this disclosure and is not intended to limit this disclosure. Any modification, equivalent replacement and improvement made within the spirit and principles of this disclosure shall be included in the protection scope of this disclosure.

What is claimed is:

1. A power expanding apparatus for three-phase LLC circuit, comprising a first full-bridge switching network, a second full-bridge switching network, a first resonant network, a second resonant network, a first transformer network, a second transformer network, a first rectifying network, and a second rectifying network;

a primary side of the first transformer network is connected with an input voltage sequentially through the first resonant network and the first full-bridge switching network, a secondary side of the first transformer network is connected with a load through the first rectifying network; a primary side of the second transformer network is connected with the input voltage sequentially through the second resonant network and the second full-bridge switching network, a secondary side of the second transformer network is connected with the load through the second rectifying network;

the first transformer network comprises a first transformer unit, a second transformer unit, and a third transformer unit; the second transformer network comprises a fourth transformer unit, a fifth transformer unit, and a sixth transformer unit;

secondary sides of any two transformer units in the first transformer network are in star-type connection with a secondary side of any one transformer unit in the second transformer network;

the first full-bridge switching network comprises a first full-bridge switching unit, a second full-bridge switching unit, and a third full-bridge switching unit; the first resonant network comprises a first resonant unit, a second resonant unit, and a third resonant unit; the first rectifying network comprises a first rectifying unit, a second rectifying unit, and a third rectifying unit; the second full-bridge switching network comprises a fourth full-bridge switching unit, a fifth full-bridge switching unit, and a sixth full-bridge switching unit; the second resonant network comprises a fourth resonant unit, a fifth resonant unit, and a sixth resonant unit; the second rectifying network comprises a fourth rectifying unit, a fifth rectifying unit, and a sixth rectifying unit; the first transformer unit comprises a first transformer and a second transformer, the second transformer unit comprises a third transformer and a fourth transformer, the third transformer unit comprises a fifth transformer and a sixth transformer, the fourth transformer unit comprises a seventh transformer and an eighth transformer, the fifth transformer unit comprises a ninth transformer and a tenth transformer, the sixth transformer unit comprises an eleventh transformer and a twelfth transformer;

a first terminal of a primary side of the first transformer is connected with a first terminal of the first full-bridge switching unit through the first resonant unit, a second terminal of the primary side of the first transformer is connected with a first terminal of a primary side of the second transformer, a second terminal of the primary side of the second transformer is connected with a second terminal of the first full-bridge switching unit, a first terminal of a primary side of the third transformer is connected with a first terminal of the second full-bridge switching unit through the second resonant unit, a second terminal of the primary side of the third transformer is connected with a first terminal of a primary side of the fourth transformer, a second terminal of the primary side of the fourth transformer is connected with a second terminal of the second full-bridge switching unit, a first terminal of a primary side of the fifth transformer is connected with a first terminal of the third full-bridge switching unit through a third resonant unit, a second terminal of the primary side of the fifth transformer is connected with a first terminal of a primary side of the sixth transformer, a second terminal of the primary side of the sixth transformer is connected with a second terminal of the third full-bridge switching unit, a first terminal of a primary side of the seventh transformer is connected with a first terminal of the fourth full-bridge switching unit through the fourth resonant unit, a second terminal of the primary side of the seventh transformer is connected with a first terminal of a primary side of the eighth transformer, a second terminal of the primary side of the eighth transformer is connected with a second terminal of the fourth full-bridge switching unit, a first terminal of a primary side of the ninth transformer is connected with a first terminal of the fifth full-bridge switching unit through the fifth resonant unit, a second terminal of the primary side of the ninth transformer is connected with a first terminal of a primary side of the tenth transformer, a second terminal of the primary side of the tenth transformer is connected with a second terminal of the fifth full-bridge switching unit, a first terminal of a primary side of the eleventh transformer is connected with a first terminal of the sixth full-bridge switching unit through the sixth resonant unit, a second terminal of the primary side of the eleventh transformer is connected with a first terminal of a primary side of the twelfth transformer, a second terminal of the primary side of the twelfth transformer is connected with a second terminal of the sixth full-bridge switching unit;

a first terminal of a secondary side of the first transformer is connected with a first terminal of the first rectifying unit, a first terminal of a secondary side of the second transformer is connected with a second terminal of the first rectifying unit, a first terminal of a secondary side of the third transformer is connected with a first terminal of the second rectifying unit, a first terminal of a secondary side of the fourth transformer is connected with a second terminal of the second rectifying unit, a first terminal of a secondary side of the fifth transformer is connected with a first terminal of the fourth rectifying unit, a first terminal of a secondary side of the sixth transformer is connected with a second terminal of the fourth rectifying unit, a first terminal of a secondary side of the seventh transformer is connected with a first terminal of the third rectifying unit, a first terminal of a secondary side of the eighth transformer is connected with a second terminal of the third rectifying unit, a first terminal of a secondary side of the ninth transformer is connected with a first terminal of the fifth rectifying unit, a first terminal of a secondary side of the tenth transformer is connected with a second terminal of the fifth rectifying unit, a first terminal of a secondary side of the eleventh transformer is connected with a first terminal of the sixth rectifying unit, and a first terminal of a secondary side of the twelfth transformer is connected with a second terminal of the sixth rectifying unit;

a second terminal of the secondary side of the first transformer is connected with a second terminal of the secondary side of the third transformer and a second terminal of the secondary side of the seventh transformer; a second terminal of the secondary side of the second transformer is connected with a second terminal of the secondary side of the fourth transformer and a second terminal of the secondary side of the eighth transformer; a second terminal of the secondary side of the fifth transformer is connected with a second terminal of the secondary side of the ninth transformer and a second terminal of the secondary side of the eleventh transformer; a second terminal of the secondary side of the sixth transformer is connected with a second terminal of the secondary side of the tenth transformer and a second terminal of the secondary side of the twelfth transformer.

2. The power expanding apparatus for three-phase LLC circuit according to claim 1, wherein the first full-bridge switching network and the second full-bridge switching network are connected in series between a first input terminal and a second input terminal; and the first rectifying network and the second rectifying network are connected in parallel between a first output terminal and a second output terminal.

3. The power expanding apparatus for three-phase LLC circuit according to claim 1, wherein the first full-bridge switching network and the second full-bridge switching network are connected in parallel between a first input terminal and a second input terminal; and the first rectifying network and the second rectifying network are connected in parallel between a first output terminal and a second output terminal.

4. The power expanding apparatus for three-phase LLC circuit according to claim 1, wherein the first full-bridge switching network and the second full-bridge switching network are connected in parallel between a first input terminal and a second input terminal; and the first rectifying network and the second rectifying network are connected in series between a first output terminal and a second output terminal.

5. The power expanding apparatus for three-phase LLC circuit according to claim 1, wherein the first full-bridge switching network and the second full-bridge switching network are connected in series between a first input terminal and a second input terminal; and the first rectifying network and the second rectifying network are connected in series between a first output terminal and a second output terminal.

* * * * *